(12) United States Patent
Katsuma et al.

(10) Patent No.: US 7,417,806 B2
(45) Date of Patent: Aug. 26, 2008

(54) LENS WITH REFERENCE MOUNTING SURFACE

(75) Inventors: Toshiaki Katsuma, Tokyo (JP); Masao Mori, Saitama (JP); Yu Kitahara, Saitama (JP); Makoto Oomura, Ina Machi (JP); Yoko Yamamoto, Fuchu (JP)

(73) Assignee: Fujinon Corporation, Saitama (JP)

( * ) Notice: Subject to any disclaimer, the term of this patent is extended or adjusted under 35 U.S.C. 154(b) by 184 days.

(21) Appl. No.: 11/429,989

(22) Filed: May 9, 2006

(65) Prior Publication Data

US 2006/0256454 A1    Nov. 16, 2006

(30) Foreign Application Priority Data

May 12, 2005    (JP) ............................. 2005-139723

(51) Int. Cl.
    *G02B 7/02* (2006.01)
(52) U.S. Cl. ...................................... 359/811; 359/819
(58) Field of Classification Search ................. 359/811, 359/819; 385/33
    See application file for complete search history.

(56) References Cited

U.S. PATENT DOCUMENTS 6,504,975 B1 * 1/2003 Yamagata et al. ............. 385/33
7,204,649 B2 * 4/2007 Tanaka ......................... 385/93

FOREIGN PATENT DOCUMENTS

JP          9-61665        3/1997

* cited by examiner

*Primary Examiner*—Joseph Martinez
(74) *Attorney, Agent, or Firm*—Arnold International; Bruce Y. Arnold

(57) ABSTRACT

A lens is equipped with a reference mounting surface that is abutted to a surface of a lens support member at the time of mounting the lens, wherein the reference mounting surface is arranged between a plane which is normal to the optical axis of the lens and includes a principal point on the incident light side of the lens and a plane which is normal to the optical axis of the lens and includes a principal point on the outgoing light side of the lens.

6 Claims, 1 Drawing Sheet

LENS WITH REFERENCE MOUNTING SURFACE

TECHNICAL FIELD

The present invention relates to a lens equipped with a reference mounting surface for alignment of the lens; particularly, with the reference mounting surface being suitable for attachment to a support surface of an optical coupler in an optical communications system.

BACKGROUND OF THE INVENTION

In an optical communications system that uses one or more optical fibers, wherein an optical coupler having a light sending side and a light receiving side is used, there has been a need for an optical coupling system wherein a divergent light beam that is emitted from the light sending side of the optical coupler is collected and formed into a convergent light beam that is then incident onto an end surface of an optical fiber on the light receiving side of the optical coupler.

Conventionally, a so-called ball lens (i.e., a spherical lens) has been used as a lens in such an optical coupling system to collect the light and to form the light into a convergent beam. Such a lens has an advantage in that, since no alignment is required due to its spherical shape, it is easily mounted. However, there is a problem in that a ball lens does not efficiently condense light due to the spherical aberration of such a lens being large.

In Japanese Laid-Open Patent Application No. H09-061665 another design is disclosed that uses an aspherical lens as a coupling lens in an optical communications system that enables the light to be more efficiently condensed, as compared with using a ball lens, and thus the coupling efficiency of the optical coupler is enhanced.

With a lens having a fixed optical axis such as with an aspherical lens, it is generally difficult to obtain a desired optical performance unless the alignment of the lens is accurately performed. When the lens is used as a component of an optical coupler in an optical communications system, alignment errors (especially, inclination errors) of the lens result in a large shifting of the position of the focus point, and thus the coupling efficiency of the optical coupler may be remarkably reduced.

Conventionally, a lens of an optical coupler in an optical communications system must be accurately aligned with meticulous care, due to the mounting operation of the lens being less than 'user friendly'.

BRIEF SUMMARY OF THE INVENTION

An objective of the present invention is to provide a lens having a reference mounting surface such that the positioning of the lens becomes insensitive to alignment errors, thereby enabling a sufficient optical performance of the lens to be achieved by using a simple positioning operation when mounting the lens in an optical coupler. In order to accomplish this objective, in the present invention, the reference mounting surface is positioned between a plane which is normal to the optical axis and includes a principal point on the incident light side of the lens and a plane which is normal to the optical axis and includes a principal point on the outgoing light side of the lens.

In other words, the present invention is characterized by the fact that the lens is provided with a reference mounting surface for alignment that makes contact with a lens support member surface at the time of mounting the lens, and the reference mounting surface is positioned between a plane which is normal to the optical axis and includes a principal point on the incident light side of the lens and a plane which is normal to the optical axis and includes a principal point on the outgoing light side of the lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The numerical aperture of a lens of an optical coupler in an optical communications system may be different on the incident light side and the outgoing light side. In such a case, it is preferable that the reference mounting surface be arranged in a position that is nearer the lens surface side having the larger numerical aperture. In the case of the incident light onto the lens being substantially collimated, it is preferable that the reference mounting surface be normal to the optical axis and positioned roughly at the position of a plane that is normal to the optical axis and includes a principal point on the outgoing light side of the lens. On the other hand, when the outgoing light is substantially collimated light, it is preferable that the reference mounting surface be normal to the optical axis and positioned roughly at the position of a plane that is normal to the optical axis and includes a principal point on the incident light side of the lens.

Furthermore, it is possible to use a lens having a reference mounting surface according to the present invention in any application where highly accurate alignment of a lens is required in mounting the lens.

In a lens having a reference mounting surface according to the present invention, the arrangement of a reference mounting surface that contacts a surface of a lens support member at the time of mounting the lens, with the reference mounting surface being positioned between a plane which is normal to the optical axis and that includes a principal point on the incident light side of the lens and a plane which is normal to the optical axis and that includes a principal point on the outgoing light side, results in the following effect. According to principles of the nodal slide method, by having the reference mounting surface positioned between a plane which is normal to the optical axis and includes a principal point on the incident light side of the lens and a plane which is normal to the optical axis and includes a principal point on the outgoing light side, it is possible to control the positional shifting of the focus point even when there is an alignment error such as an inclination error of the lens due to manufacturing tolerances, as compared to a lens whose reference mounting surface is positioned outside these two planes.

Therefore, the lens with a reference mounting surface according to the present invention can be mounted using a simple positioning operation that attaches the reference mounting surface to a surface of a lens support member, making it possible to accurately position the lens so that it demonstrates sufficient optical performance in the mounted state.

Two embodiments of the present invention will now be described with reference to the drawings.

Embodiment 1

Figure 1:
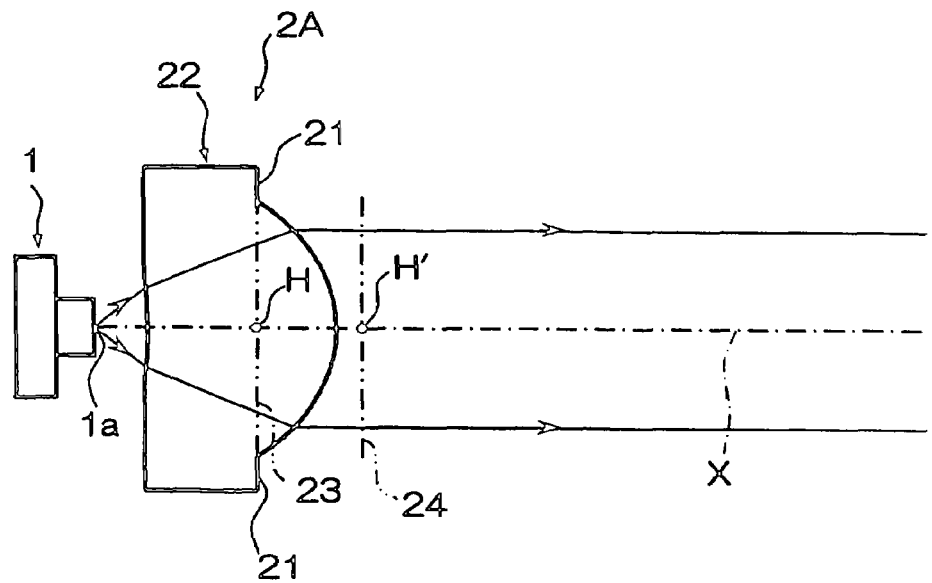
FIG. 1 shows a lens having a reference mounting surface according to Embodiment 1 of the present invention.

FIG. 1 schematically shows the construction of a lens having a reference mounting surface according to Embodiment 1 of the present invention. The lens having a reference mounting surface (hereafter referred to as "lens 2A") is shown in FIG. 1 as being a single lens arranged in the optical coupler of an optical communications system. The lens is constructed so as to collimate divergent light rays emitted from a light emitting point 1a of a light source device 1. The light source device 1 may be a semiconductor laser (LD) or a light-emitting diode (LED).

As illustrated, within a luminous flux passage region of the lens 2A, the surfaces of the lens are formed as a meniscus lens with its convex surface on the outgoing light side. A flange 22 having a reference mounting surface 21 for abutting to a surface (not shown) of a lens support member at the time of mounting the lens is provided. The reference mounting surface 21 is arranged in a position between a plane 23 that is normal to the optical axis X and includes a principal point H on the incident light side (hereafter referred to as "plane 23 on the incident light side") and a plane 24 that is normal to the optical axis X and includes a principal point H' on the outgoing light side (hereafter referred to as "plane 24 on the outgoing light side") and is roughly parallel to the two planes 23 and 24. Specifically, the reference mounting surface 21 is arranged in a position roughly corresponding to the position of the plane 23 on the incident light side.

Lens 2A is aligned by attaching the reference mounting surface 21 to a surface of the lens support member at the time of mounting the lens. For example, when there is a difference in elevation within the reference mounting surface 21 due to a manufacturing error, an alignment error (an inclination error of the lens 2A) may be observed when such a lens is mounted. However, with the lens 2A having the reference mounting surface 21 arranged at the position roughly corresponding to the position of the plane 23 on the incident light side, even when this alignment error is observed, the outgoing direction of the collimated light will not substantially shift due to the principles of the nodal slide method.

Therefore, with the lens 2A, it is possible to demonstrate a desired optical performance in the mounted state using a simple positioning operation that attaches the reference mounting surface 21 to a support surface of the lens support member.

A second embodiment of the present invention will now be described.

Embodiment 2

Figure 2:
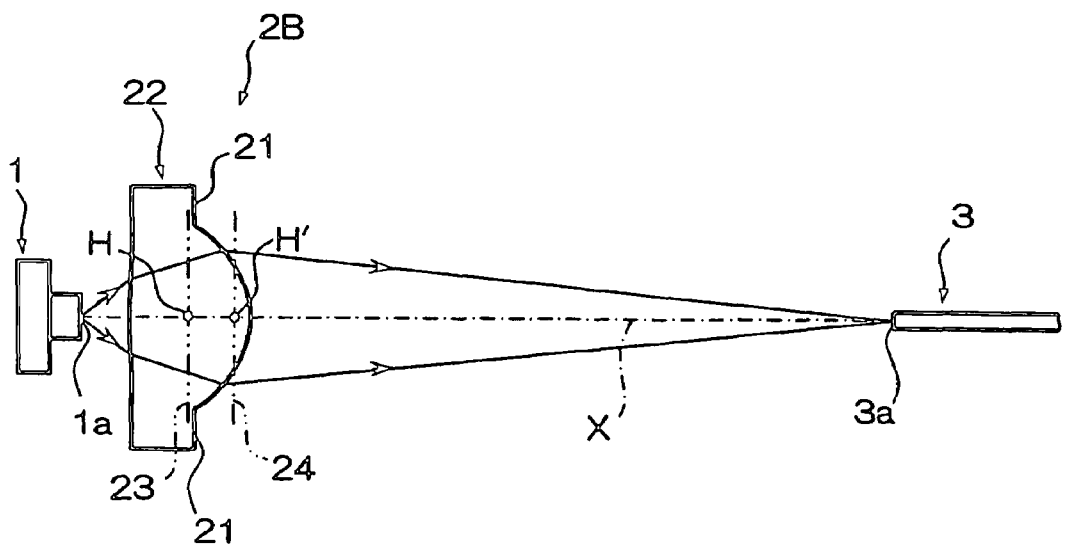
FIG. 2 shows a lens having a reference mounting surface according to Embodiment 2 of the present invention.

FIG. 2 schematically shows the construction of a lens with a reference mounting surface according to Embodiment 2 of the present invention. In this embodiment, identical components that are shared with the first embodiment are shown in FIG. 2 using the same numbers as used in FIG. 1.

A lens with a reference mounting surface (hereinafter referred to as "lens 2B") shown in FIG. 2 is a single lens arranged between the light source device 1 and an optical fiber 3 on the light receiving side of the optical coupler in an optical communications system, and is constructed such that a divergent light emitted from a light emitting point 1a of the light source device 1 is collected and is incident on an incident light surface 3a of the optical fiber 3.

As illustrated, the lens 2B is a biconvex lens having surfaces of different curvature, with the numerical aperture (NA) in the luminous flux passage region of the lens surface on the incident light side being greater than that of the numerical aperture of the lens surface on the outgoing light side. A flange 22 having a reference mounting surface 21 for alignment that contacts a surface on the lens support member at the time of mounting the lens is integrally formed at the periphery of the lens 2B.

The reference mounting surface 21 is positioned between a plane 23 that is normal to the optical axis X and that includes a principal point H on the incident light side of the lens 2B and a plane 24 that is normal to the optical axis X and that includes a principal point H' on the outgoing light side of the lens 2B. In addition, the reference mounting surface is roughly parallel to the two planes 23 and 24, and is positioned nearer the lens surface side having the larger numerical aperture (i.e., in the present embodiment, the lens surface on the incident light side).

Furthermore, it is preferable that the reference mounting surface 21 be positioned such that the distance from the plane 23 on the incident light side to the reference mounting surface 21 divided by the distance from the reference mounting surface 21 to the plane 24 on the outgoing light side is roughly the same ratio as the distance from the light emitting point 1a of the light source device 1 to the plane 23 on the incident light side divided by the distance from the plane 24 on the outgoing light side to the incident light end surface 3a of the optical fiber 3.

Lens 2B is aligned by abutting the reference mounting surface 21 to a surface of the lens support member at the time of mounting the lens. For example, when there is a difference of elevation within the reference mounting surface 21 due to a manufacturing error, an alignment error, such as an inclination error of the lens 2B, may be observed. However, with the lens 2B having a reference mounting surface 21 arranged as per the present invention, even when such an alignment error occurs, it is possible to control the positional shifting of a focus point of light converged by the lens due to the principles of the nodal slide method. Therefore, it is possible for the lens 2B to demonstrate sufficient optical performance when mounted in an optical coupler by using a simple positioning operation that abuts the reference mounting surface 21 to a mounting surface of the optical coupler.

The invention being thus described, it will be obvious that the same may be varied in many ways. For example, the reference mounting surface 21 for alignment in each of the above embodiments is arranged on the flange 22 around the periphery of the lens 2A or 2B. However, as long as the lens can be aligned by abutting the reference mounting surface 21 to a surface of the lens support member at the time of mounting the lens, the particular configuration of the reference mounting surface may be varied.

Further, the particular shape of the lens in the luminous flux passage region may be varied from those discussed in the two embodiments mentioned above, namely, one that uses a meniscus lens with its convex surface on outgoing light side or one that uses a biconvex lens having lens surfaces of different curvatures, with its surface having the smaller numerical aperture on the outgoing light side.

In addition, in the two embodiments discussed above, the lens is a component of an optical coupler in an optical communications system. However, other applications of the present invention are possible, as the lens with reference mounting surface of the present invention is not limited to the field of optical communications, but is also applicable to various lenses that require a high accuracy of alignment at the time of mounting.

Further, the lens having a reference mounting surface according to the present invention is not limited to a single lens element, as it may be used with a lens component that is formed of multiple lens elements, such as a lens component that is cemented.

Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A lens having a reference mounting surface that, at the time of mounting the lens, is abutted to a surface of a lens support member, wherein the reference mounting surface is positioned between a plane which is normal to the optical axis of the lens and includes a principal point on the incident light side of the lens and a plane which is normal to the optical axis of the lens and includes a principal point on the outgoing light side of the lens.

2. The lens according to claim 1, wherein the lens has opposed optical surfaces and the reference mounting surface is arranged nearer the lens surface side having the greater numerical aperture.

3. The lens according to claim 2, said lens being arranged in an optical coupler of an optical communications system.

4. The lens with according to claim 1, wherein:
one of an incident light beam or an outgoing light beam is a collimated beam; and
the reference mounting surface is arranged in a position roughly corresponding to the position of a plane that is normal to the optical axis of the lens and
(a) when the incident light beam is a collimated beam, said plane includes a principal point on the outgoing light side of the lens; or
(b) when the outgoing light beam is a collimated beam, said plane includes a principal point on the incident light side of the lens.

5. The lens according to claim 4, said lens being arranged in an optical coupler of an optical communications system.

6. The lens according to claim 1, said lens being arranged in an optical coupler of an optical communications system.

* * * * *